(12) United States Patent
Besutti et al.

(10) Patent No.: US 11,703,806 B2
(45) Date of Patent: Jul. 18, 2023

(54) METHOD FOR MANUFACTURING A BEVELLED STONE, PARTICULARLY FOR A HOROLOGICAL MOVEMENT

(71) Applicant: Comadur SA, Le Locle (CH)

(72) Inventors: Bruno Besutti, Charquemont (FR); Sebastien Retrouvey, Chissey sur Loue (FR); Sebastien Midol, Sancey (FR)

(73) Assignee: Comadur SA, Le Locle (CH)

( * ) Notice: Subject to any disclaimer, the term of this patent is extended or adjusted under 35 U.S.C. 154(b) by 303 days.

(21) Appl. No.: 16/893,590

(22) Filed: Jun. 5, 2020

(65) Prior Publication Data

US 2021/0026307 A1    Jan. 28, 2021

(30) Foreign Application Priority Data

Jul. 26, 2019    (EP) .................................... 19188535

(51) Int. Cl.
*B28D 1/22* (2006.01)
*G04B 31/06* (2006.01)
(Continued)

(52) U.S. Cl.
CPC .............. *G04B 31/06* (2013.01); *B22F 3/162* (2013.01); *B22F 5/106* (2013.01); *B28B 3/021* (2013.01);
(Continued)

(58) Field of Classification Search
CPC .. G04B 31/06; G04B 31/0087; G04B 31/004; G04B 31/02; B22F 3/162; B22F 5/106;
(Continued)

(56) References Cited

U.S. PATENT DOCUMENTS

2003/0222025 A1* 12/2003 Archuleta .......... B01J 20/28014
210/799
2009/0022036 A1    1/2009 Ide et al.
(Continued)

FOREIGN PATENT DOCUMENTS

CH    156949 A    8/1932
CH    216723 A    9/1941
(Continued)

OTHER PUBLICATIONS

Maeda K, JP-2003080514-A description machine translation, Mar. 19, 2003 (Year: 2003).*
(Continued)

*Primary Examiner* — Nicholas A Wang
*Assistant Examiner* — Maxwell Xavier Duffy
(74) *Attorney, Agent, or Firm* — Oblon, McClelland, Maier & Neustadt, L.L.P.

(57) ABSTRACT

A method and device for manufacturing a bevelled stone, particularly for a timepiece are disclosed. A precursor is produced from a mixture of at least one material in powder form with a binder. The method includes pressing the precursor so as to form a green body, using a top die and a bottom die comprising a protruding rib, sintering the green body so as to form a body of the future stone in at least one material, the body including a peripheral face and a bottom face provided with a groove, and machining the body including a substep of planning the peripheral face up to the groove, such that an inner wall of the groove forms at least a flared part of the peripheral face of the stone.

14 Claims, 3 Drawing Sheets

(51) Int. Cl.
  *B22F 3/16*    (2006.01)
  *B22F 5/10*    (2006.01)
  *G04B 31/008*  (2006.01)
  *G04D 3/00*    (2006.01)
  *C04B 35/105*  (2006.01)
  *B28B 3/02*    (2006.01)
  *B28D 1/20*    (2006.01)

(52) U.S. Cl.
  CPC .............. *B28D 1/20* (2013.01); *B28D 1/22* (2013.01); *C04B 35/105* (2013.01); *G04B 31/0087* (2013.01); *G04D 3/0058* (2013.01); *G04D 3/0071* (2013.01); *B22F 2302/10* (2013.01); *B22F 2302/20* (2013.01); *B22F 2302/25* (2013.01)

(58) Field of Classification Search
  CPC ............ B22F 2302/10; B22F 2302/20; B22F 2302/25; G04D 3/0058; G04D 3/0071; G04D 3/0056; B28B 3/02; B28B 11/243; B28B 17/026; B28D 1/16; B28D 1/20; C04B 2235/945
  See application file for complete search history.

(56) References Cited

U.S. PATENT DOCUMENTS

| | | | |
|---|---|---|---|
| 2012/0085758 A1* | 4/2012 | Svensson | B30B 11/002 29/402.08 |
| 2013/0049575 A1* | 2/2013 | Fujita | C04B 41/86 428/428 |
| 2014/0254332 A1 | 9/2014 | Besutti et al. | |
| 2019/0113890 A1 | 4/2019 | Bazin et al. | |
| 2019/0146416 A1 | 5/2019 | Besutti et al. | |

FOREIGN PATENT DOCUMENTS

| | | | |
|---|---|---|---|
| CH | 244264 A | | 8/1946 |
| CH | 707 740 A2 | | 9/2014 |
| CN | 109773944 A | | 5/2019 |
| EP | 2 778 801 A1 | | 9/2014 |
| EP | 3 483 665 A1 | | 5/2019 |
| JP | 2003-80514 A | | 3/2003 |
| JP | 2003080514 A | * | 3/2003 |
| JP | 2009-25654 A | | 2/2009 |
| JP | 2011-180006 A | | 9/2011 |
| JP | 5931104 B2 | | 6/2016 |
| JP | 2019-74513 A | | 5/2019 |
| JP | 2019-90801 A | | 6/2019 |
| KR | 10-2019-0054968 A | | 5/2019 |

OTHER PUBLICATIONS

Japanese Office Action dated Jul. 6, 2021 in Japanese Patent Application No. 2020-108539 (with English translation), citing documents AM-AP therein, 17 pages.

Combined Chinese Office Action and Search Report dated Aug. 11, 2021 in Chinese Patent Application No. 202010722920.X (with English translation of Categories of Cited Documents), citing documents AQ-AU therein, 8 pages.

Notice of Grounds for Rejection dated Nov. 16, 2021 in Korean Patent Application No. 10-2020-0088425 (with English language translation), citing documents AO and AP therein, 11 pages.

European Search Report dated Feb. 28, 2020 in European Application 19188535.9 filed Jul. 26, 2019 (with English Translation of Categories of Citied Documents), citing documents AA-AB and AO-AQ therein, 3 pages.

* cited by examiner

METHOD FOR MANUFACTURING A BEVELLED STONE, PARTICULARLY FOR A HOROLOGICAL MOVEMENT

CROSS-REFERENCE TO RELATED APPLICATION

This application claims priority to European Patent Application No. 19188535.9 filed on Jul. 26, 2019, the entire disclosure of which is hereby incorporated herein by reference.

FIELD OF THE INVENTION

The invention relates to a method for manufacturing a bevelled stone, particularly for a horological movement.

The invention also relates to a manufacturing system suitable for using the method.

BACKGROUND OF THE INVENTION

In the prior art of horology, ruby or sapphire type stones are particularly used to form endstones or guiding elements, known as bearings, in timepieces. These endstones and guiding elements are intended to come into contact with pivots in order to render the latter rotatable with minimal friction. Thus, they form, for example, all or part of a bearing-block of a rotatably fitted shaft. The guiding elements generally comprise a through hole in order to insert the pivot shaft therein.

In principle, synthetic stones are used in horological movements. In particular, the Verneuil type method for manufacturing monocrystalline stones is known. Polycrystalline type stones also exist, which are manufactured by pressing a precursor with a view to obtaining a green body of the future stone using a pressing tool. The stones are then machined to obtain a finished shape to the desired dimensions.

In particular, regarding the polycrystalline stone guiding elements, the pressing tool is for example provided with a wire contributing to the construction of a hole blank. Monocrystalline type stones are first laser-bored to obtain the hole blank. The final size of the hole is subsequently obtained by means of machining.

The stones are generally sized to be positioned in the bed of a bearing-block assembly. Shock-absorbing bearing-blocks particularly exist, which are suitable for absorbing shocks.

The configuration of a conventional shock-absorbing bearing-block 1 is represented by FIG. 1. An olive domed stone 2 forming an axial guiding element for the pivot, which is also commonly known as a bearing, is driven into a bearing-block support commonly known as a setting 3, whereon an endstone 4 is fitted. The setting 3 is held pressing against the bottom of a bearing-block 5 by elastic means, generally a shock-absorbing spring 6, arranged to exert an axial force on the top part of the endstone 4. Such a shock-absorbing bearing-block makes it possible to absorb shocks along the longitudinal axis of the pivot, the assembly formed of the setting, the domed stone, and the endstone, being suitable for moving thanks to the shock-absorbing spring 6.

The setting 3 further includes a flared outer wall arranged in line with a flared inner wall disposed at the periphery of the bottom of the bearing-block 5. Alternative embodiments also exist whereby the setting includes an outer wall having a surface of convex shape, i.e. domed. Thus, the shock-absorbing bearing-block makes it possible to absorb radial shocks, thanks to the flared walls of the setting and of the bottom of the bearing-block 5. Indeed, the assembly can move radially and axially simultaneously.

However, it is sought to have a single stone capable of forming both the guiding element and the setting to simplify the arrangement of the elements and enhance the shock resistance. For this, it is necessary to obtain a stone with an at least partially flared peripheral wall. However, current machining methods are complex to implement in order to achieve this.

SUMMARY OF THE INVENTION

The aim of the present invention is that of remedying in full or in part the drawbacks cited above by providing a method for manufacturing a stone provided with an at least partially flared peripheral face, in order to be capable of being inserted in a shock-absorbing bearing-block as described above. In this context, such a manufacturing method is repeatable, without causing any damage of the stone or indeed of the system for manufacturing this stone.

For this purpose, the invention relates to a method for manufacturing a bevelled stone, particularly for a timepiece. The method is remarkable in that it includes the following steps:

producing a precursor from a mixture of at least one material in powder form with a binder;

pressing the precursor, using a top die and a bottom die comprising a protruding rib so as to form a green body, sintering said green body so as to form a body of the future stone in said at least one material, the body comprising a peripheral face and a bottom face provided with a groove, and machining the body including a substep of planing the peripheral face up to the groove such that an inner wall of the groove forms at least a flared part of the peripheral face of the stone, Thus, such a method makes it possible to readily manufacture a bevelled stone provided with an at least partially flared peripheral face, the stone being preferably of polycrystal type. Such a stone can thus be inserted into a bearing-block having a shape corresponding to the flared face, particularly for absorbing lateral shocks.

According to a particular embodiment of the invention, the machining comprises a substep of recessing a recess in the top face of the body.

According to a particular embodiment of the invention, the machining comprises a substep of cutting the top face of the body, in order to obtain a top face giving the stone a predetermined thickness.

According to a particular embodiment of the invention, the pressing comprises the recessing of a hole blank by means of a punch of the bottom die.

According to a particular embodiment of the invention, the groove is embodied to be circular and/or centred on the bottom face of the stone.

According to a particular embodiment of the invention, the protruding rib and the groove have a substantially triangular cross-section, one of the sides whereof will form the flared part of the peripheral face of the stone, after planing.

According to a particular embodiment of the invention, the groove comprises an inner face and an outer face, the outer face being removed during planing.

According to a particular embodiment of the invention, the inner face is retained during planing so as to form the flared part of the peripheral face.

According to a particular embodiment of the invention, the pressing step is carried out by moving the top and bottom dies closer together in a casing.

According to a particular embodiment of the invention, the sintering step includes pyrolysis.

According to a particular embodiment of the invention, the method includes a step of finishing the stone, for example lapping and/or brushing and/or polishing.

According to a particular embodiment of the invention, the material in powder form is ceramic-based and includes at least a metal oxide, a metal nitride or a metal carbide.

According to a particular embodiment of the invention, the ceramic-based material in powder form includes aluminium oxide.

According to a particular embodiment of the invention, the ceramic-based material in powder form further includes chromium oxide.

The invention also relates to a system for manufacturing a stone using the method according to the invention. The system is remarkable in that it comprises:

a device for producing a precursor from a mixture of at least one material in powder form with a binder;

a device for pressing the precursor comprising top and bottom dies arranged movable in a casing helping form a green body of the future stone, the bottom die comprising a protruding rib;

a device for sintering said green body; and a device for machining a body of the future stone.

According to a particular embodiment of the invention, the protruding rib is substantially circular and/or centred on the bottom die.

According to a particular embodiment of the invention, the protruding rib has a substantially triangular cross-section.

BRIEF DESCRIPTION OF THE DRAWINGS

Further specificities and advantages will emerge clearly from the description given hereinafter, which is by way of indication and in no way limiting, with reference to the appended drawings, wherein.

DETAILED DESCRIPTION OF PREFERRED EMBODIMENTS

As explained above, the invention relates to a method for manufacturing a stone suitable for forming a guiding element of a timepiece. The stone is for example intended to come into contact with a pivot in order to render the latter rotatable with minimal friction. It is therefore understood that the present invention particularly makes it possible to produce a stone suitable for forming all or part of a bearing-block of a rotatably fitted shaft.

Figure 2:
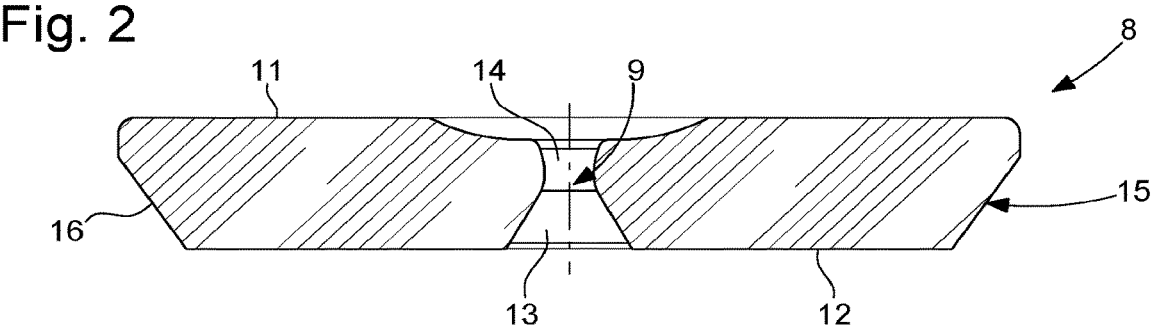
FIG. 2 is a representation of a stone obtained with the method according to the invention.

FIG. 2 is an example of a bevelled stone 8 obtained thanks to the method according to the invention. Advantageously, the stone 8 is traversed by a hole 9 intended to receive a pivot, also known as a trunnion. The stone 8 includes a top face 11 and a bottom face 12 of which one comprises a functional element, herein a cone 13, communicating with the through hole 9. In other words, the hole 9 communicates with the top face 6 and also with a substantially conical hollow defined in the bottom face 9. This hollow then forms an engagement cone 13 of the bored stone 8.

In the description, reference is made to the terms top face and bottom face with reference to the figures, particularly to distinguish them. Nevertheless, the top and bottom faces may be inverted.

It is also noted that an inner wall of the body of this stone defined at the level of the hole 9 includes a rounded zone 14 intended to minimise the contact with the pivot but also to facilitate any lubrication. It should be noted that minimising the contact with the pivot particularly makes it possible to reduce friction with the pivot.

Figure 1:
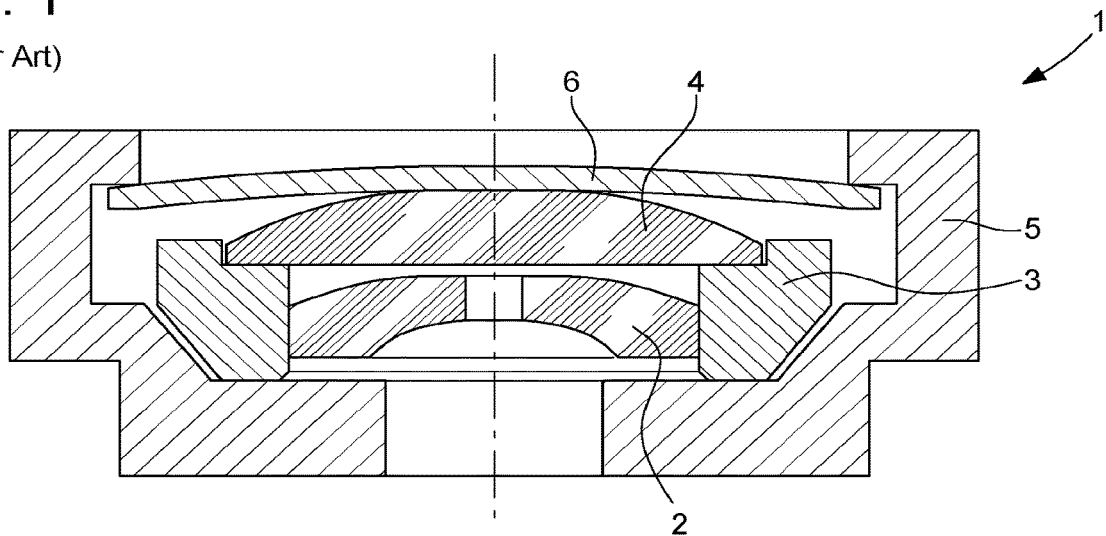
FIG. 1 represents schematically a transverse cross-section of a shock-absorbing bearing-block according to a known embodiment from the prior art.

The bevelled stone 8 further has a partially flared peripheral face 15, and connecting the bottom face 12 of lesser surface area to the top face 11 of greater surface area. The flared part 16 is intended to be in contact with an inner wall of a bearing-block so as to absorb the lateral shocks, the stone being able to slide on the wall of the block thanks to the flared wall, as in the example in FIG. 1.

The stone 8 is, preferably, formed from a polycrystalline type mineral body, the body comprising for example al2O3Cr type polyruby or ZrO2 type zirconia.

Figure 3:
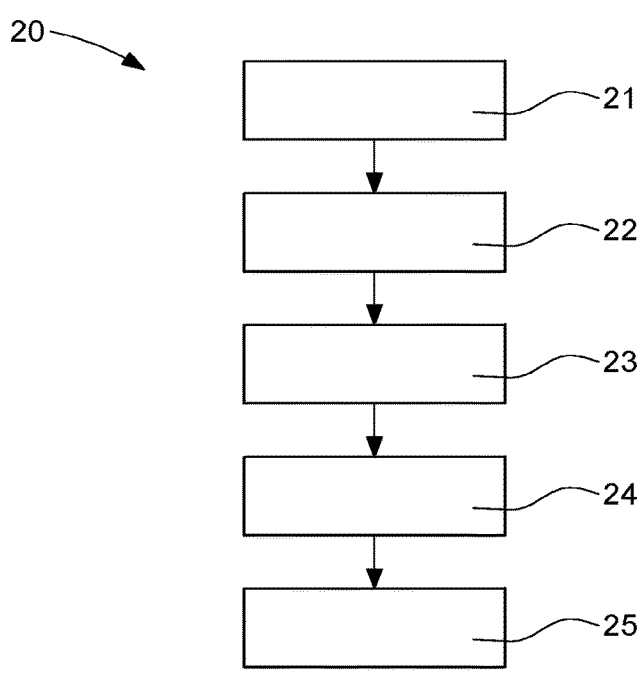
FIG. 3 is a logic diagram relating to the method for manufacturing a stone according to the invention.

The manufacturing method 20 of such a stone, which is represented in FIG. 3, includes six steps.

A first step 21 consists of producing a precursor from a mixture of at least one material in powder form with a binder. This material may be non-restrictively and non-exhaustively ceramic. This step is intended to form a precursor from a ceramic-based powder set in the binder.

In this context, the ceramic-based powder may include at least a metal oxide, a metal nitride or a metal carbide. By way of example, the ceramic-based powder may include aluminium oxide in order to form synthetic sapphire or a mixture of aluminium oxide and chromium oxide in order to form synthetic ruby, or indeed zirconium oxide. Furthermore, the binder may be of varied types such as, for example, polymer types or organic types.

Figure 9:
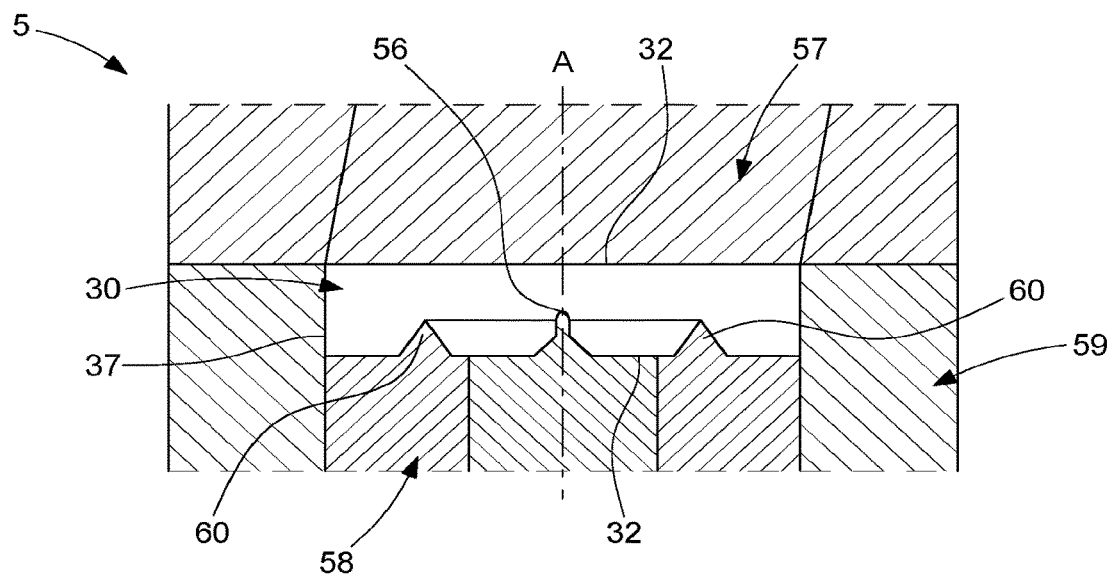
FIG. 9 is a schematic view of a pressing device of the system according to the invention.

The method then includes a second step 22 of pressing the precursor using a top die and a bottom die of a pressing device, represented in FIG. 9, in order to form the green body of the future stone.

Figure 4:
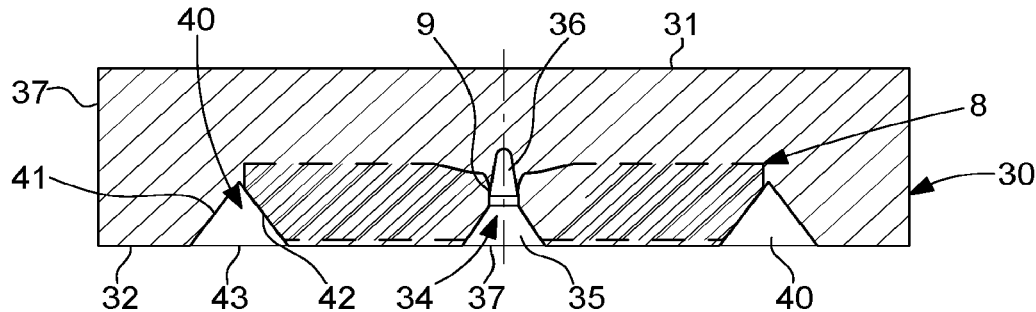
FIG. 4 is a schematic representation of a part of the green body obtained after the pressing step of the method according to the invention.

The method includes a third step 23 of sintering the green body in order to form a body 30 seen in FIG. 4 in the material which may be, as mentioned above, ceramic. In other words, this step 23 is intended to sinter the green body in order to form a ceramic body 30 of the future bored stone. Preferentially according to the invention, the sintering step 23 may include pyrolysis.

According to the invention, the body 30 comprises a peripheral face 37 and a bottom face 32 provided with a groove 40. FIG. 4 shows the body 30 of the stone after the sintering step, and the superimposed final stone 8 obtained at the end of the manufacturing method following the different steps of machining the body. The body comprises a top face 31 and a bottom face 32. The body 30 further comprises a hole blank 34 provided with top and bottom parts 35, 36 which are of different shapes. Indeed, the bottom part 35, which forms the blank of the functional element has a conical shape and the top part 36 which comprises the blank of the hole 34 has a cylindrical shape. Such a hole 34 also comprises a first opening 37 defined in the body 30 and opening into the bottom face 32 of this body 30.

It should be noted that such a blank particularly makes it possible to form the engagement cone 13 of the stone 8 for easier fitting of the pivot particularly when fitting same blind into the bored stone forming in this example a guiding element. It is therefore understood that the shape of the through hole 9 is provided by the shape of a punch of the bottom die of the pressing device. Thus, such a step 22 of pressing the device in FIG. 3, is intended to compress, using the top die and the bottom die, the precursor in order to form said green body of the future stone 8.

According to the invention, the body 30 in FIG. 4 comprises a groove 40 on the bottom face 32 thereof. The groove 40 describes, preferably, a circular path centred around the hole blank 34. The groove 40 has, preferably, a cross-section of substantially triangular shape. Nevertheless, other shapes are possible, and may for example be slightly convex or concave. As shown in the figure, the diameter of the circular path of the groove 40 determines the width of the final stone.

The groove 40 is circular and centred on the bottom face of the stone. The groove has a substantially triangular cross-section. The groove comprises an inner face 41 and an outer face 42 forming the two edges of the triangular cross-section thereof, the third edge 43 being open onto the bottom face of the body. The inner face 41 will form the flared part of the peripheral face, whereas the outer face 42 will be subsequently removed. The periphery of the final stone is defined by the groove 40. The groove 40 is formed by the bottom die of the pressing device, represented in FIGS. 9 and 10, the bottom die including a negative shape of the groove 40, such as an annular protruding rib.

Figure 5:
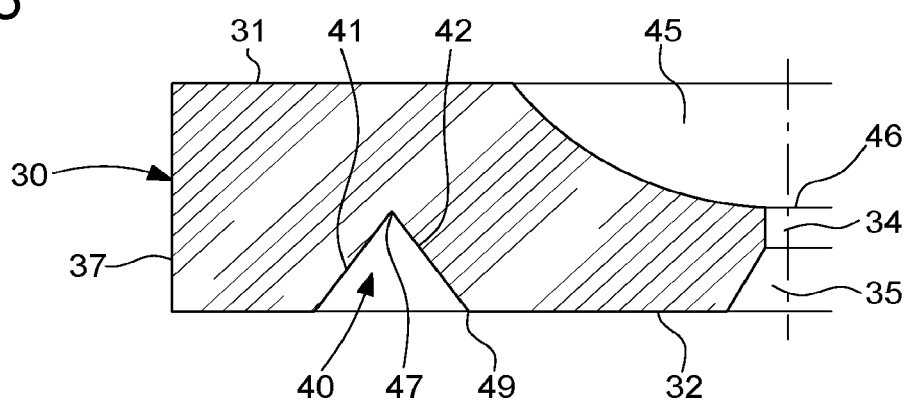
FIG. 5 is a schematic representation of a part of the stone after a first machining substep of the method according to the invention.

In FIG. 3, the method 20 comprises a fourth step 24 of machining the body 30 of the future stone 8 in FIG. 4. The fourth step 24 includes a first substep of recessing a recess 45 in the top face 31 of the body 30. The recess 45 is, preferably, substantially hemispherical, as can be seen in FIG. 5. During this substep, an opening 46 is produced in the blank of the hole 34 suitable for connecting the cone of the bottom part 35 to the recess 45. The blank of the hole 34 thus comprises a second opening 46 defined in the body and opening into the top face 31 of this body 30.

Figure 6:
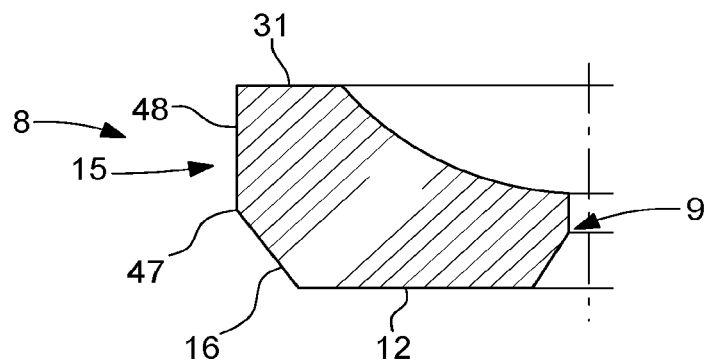
FIG. 6 is a schematic representation of a part of the stone after a second machining substep of the method according to the invention.

The machining step 24 also comprises a second substep of turning for planing the peripheral wall 37 of the body 30. As shown in FIG. 6, material is removed, preferably up to the apex 47 of the groove so as to obtain a peripheral wall 15 that is at least partially flared 16. Thus, the outer face 41 is removed during planing. On the other hand, the inner face 42 is retained so as to form the flared part 16 of the peripheral face 15 of the future stone. The flared part 16 extends from the bottom face 12 of the stone 8. A further part 48 of the peripheral wall 15 is substantially straight and connects the flared part 16 of the top face 31, preferably from the apex 47 of the groove 40. This substantially straight part 48 was formed during the planing of the body 30. The dimensions of the bottom face 12 of the stone 8 are determined by the groove 40, in particular by the junction 49 of the inner face 42 to the bottom face 32 of the body 30.

According to an alternative embodiment not shown, the peripheral face may be entirely flared. In this case, the flared part extends from the bottom face of lesser diameter, to the top face of greater diameter.

Figure 7:
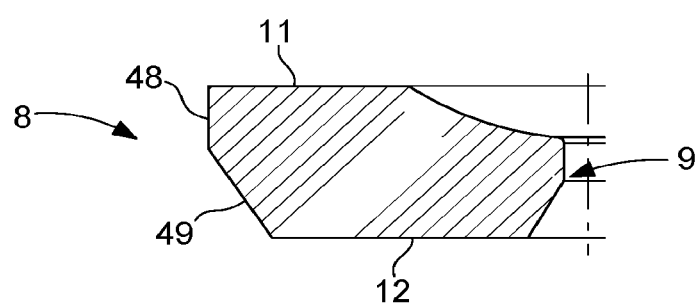
FIG. 7 is a schematic representation of a part of the stone after a third machining substep of the method according to the invention.

The machining step 24 further comprises a third substep of cutting the top face 31 of the body 30, in order to obtain a top face 11 giving the stone 8 a predetermined thickness, such as that represented in FIG. 7. The thickness of the stone 8 is chosen according to the configuration of the bearing-block.

The machining step 24 is preferentially carried out using laser type destructive radiation in order to obtain very precise etching. However, this step 24 may be obtained using other types of processes such as, for example, mechanical recessing such as mechanical boring or high-pressure water blanking.

Finally, a fifth finishing step 25 makes it possible to give the stone 8 a surface roughness compatible with the use thereof. Such a finishing step 25 may thus include lapping and/or brushing and/or polishing enabling adjustment of the final dimensions and/or removal of edges and/or local modification of roughness. It is sought for example to obtain a surface roughness Ra=0.025 µm. Such a finishing step 25 may thus include lapping and/or brushing and/or polishing enabling adjustment of the final dimensions and/or removal of edges and/or local modification of roughness.

Figure 8:
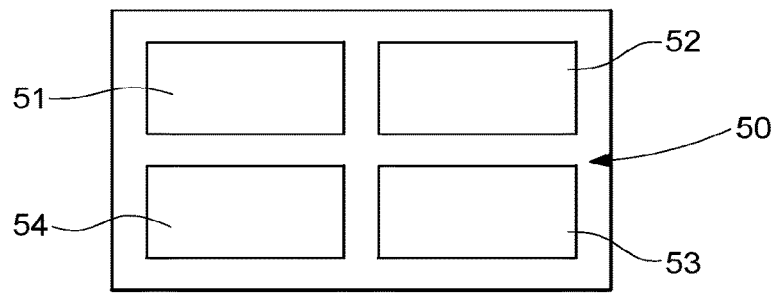
FIG. 8 is a schematic representation of a system for manufacturing a stone according to the invention.

With reference to FIG. 8, the invention also relates to a system 50 for manufacturing the stone. This system 50 comprises the following different devices:
- a device for producing 51 a precursor from a mixture of at least one material in powder form with a binder;
- a device for pressing 52 the precursor comprising top and bottom dies 57, 58 arranged movable in a casing 59 helping form a green body of the future stone 8;
- a device for sintering 53 said green body; and
- a device for machining 54 the body 30 of the future stone 8 obtained from sintering the green body.

It should be noted that at least two of these devices 51 to 54 can form a single entity of the system 50 together. Such a system 50 is suitable for carrying out a method for manufacturing the stone 8 represented in FIG. 2 via the steps in FIGS. 4 to 7.

Figure 10:
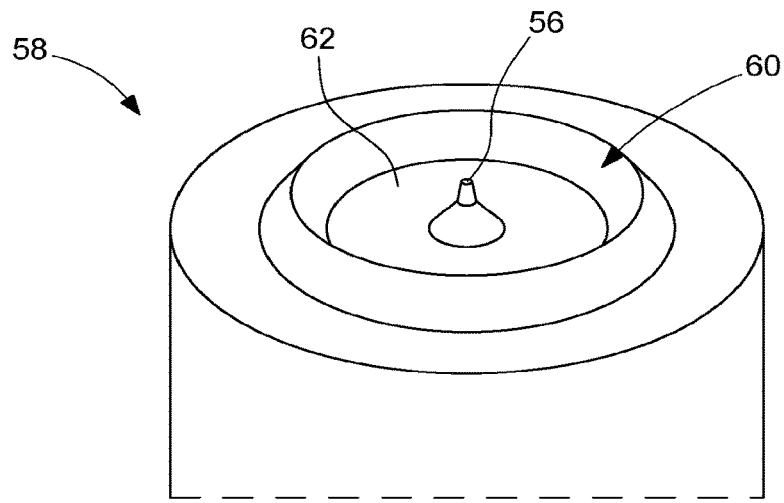
FIG. 10 is a schematic view of a bottom die of the pressing device of the system according to the invention.

In the pressing device 52 seen in FIGS. 9 and 10, each die 57, 58 is fastened to a dual-acting press. According to the invention, one of the dies 57, 58 (or both) is moved closer to the other along the directions A in the casing 59 of this pressing device 52 in order to form not only the top and bottom faces 31, 32 of a body 30 of the future stone 8, but also the peripheral face 37 of this body 30. In this pressing device 52, the dies 57, 58 are substantially planar and the bottom die 58 includes a punch 56 intended to form a one-eyed cavity 34 in the body 30. This punch 56 comprises a main part having a conical shape and an essentially cylindrical distal part which is provided with a point. The main part and the distal part are intended to form respectively the bottom part 35 and the top part 36 of the one-eyed cavity 34.

According to the invention, the bottom die 58 further includes a protruding rib 60 configured to form the groove 40 on the bottom face 32 of the body 30. The protruding rib 60 is, preferably, circular and centred on the bottom die 58. The protruding rib 60 has dimensions and a shape corresponding to those of the groove 40, because it forms the groove 40 in the bottom face of the body 30. Thus, the protruding rib 60 also has, preferably, a substantially triangular cross-section. The bottom die 58 comprises a face 62 delimited by the protruding rib 60 and corresponding to the dimensions of the bottom face 12 of the stone 8. During pressing, the bottom die 58 equipped with the punch 56 and the protruding rib 60, imprints the bottom face 32 of the body 30 with the shapes thereof. Thanks to this system 50, the green body sought is obtained, which is subsequently sintered to form the body 30, which will make it possible to arrive at the stone 8 after machining.

Obviously, the present invention is not restricted to the example illustrated but is suitable for various alternative embodiments and modifications which will be obvious to those skilled in the art. In particular, other types of functional elements formed by other geometries of protruding ribs and/or dies 57, 58 may be envisaged advantageously according to the invention.

The invention claimed is:

1. A method for manufacturing a bevelled stone for a timepiece, comprising:
    producing a precursor from a mixture of at least one material in powder form with a binder;
    pressing the precursor so as to form a green body, using a top die and a bottom die, the bottom die comprising a protruding rib without the top die comprising a protruding rib;
    sintering said green body so as to form a body of the future stone in said at least one material, the body comprising a peripheral face and a bottom face provided with a groove; and
    machining the body including planing the peripheral face up to the groove, such that an inner wall of the groove forms at least a flared part of the peripheral face of the stone.

2. The method according to claim 1, wherein the machining comprises recessing a recess in a top face of the body.

3. The method according to claim 1, wherein the machining comprises cutting a top face of the body, in order to obtain a top face giving the stone a predetermined thickness.

4. The method according to claim 1, wherein the pressing comprises a recessing of a hole blank with a punch of the bottom die.

5. The method according to claim 1, wherein the groove is embodied to be circular and/or centered on the bottom face of the body.

6. The method according to claim 1, wherein the protruding rib and the groove have a substantially triangular cross-section, one of the sides whereof will form the flared part of the peripheral face of the stone, after planing.

7. The method according to claim 1, wherein the groove comprises an inner face and an outer face, the outer face being removed during planing.

8. The method according to claim 7, wherein the inner face is retained during planing so as to form the flared part of the peripheral face.

9. The method according to claim 1, wherein the pressing is carried out by moving the top and bottom dies closer together in a casing.

10. The method according to claim 1, wherein the sintering includes pyrolysis.

11. The method according to claim 1, further comprising finishing the stone, including lapping and/or brushing and/or polishing.

12. The method according to claim 1, wherein the material in powder form is ceramic-based and includes at least a metal oxide, a metal nitride or a metal carbide.

13. The method according to claim 12, wherein the ceramic-based material in powder form includes aluminium oxide.

14. The method according to claim 13, wherein the ceramic-based material in powder form further includes chromium oxide.

* * * * *